United States Patent
Shibuya (10) Patent No.: US 7,325,776 B2
(45) Date of Patent: Feb. 5, 2008

(54) SUSPENSORY FASTENER FOR PIPING

(75) Inventor: Seiji Shibuya, Tokyo (JP)

(73) Assignee: Akagi Co., Ltd., Tokyo (JP)

( * ) Notice: Subject to any disclaimer, the term of this patent is extended or adjusted under 35 U.S.C. 154(b) by 264 days.

(21) Appl. No.: 11/148,167

(22) Filed: Jun. 9, 2005

(65) Prior Publication Data
US 2006/0226300 A1    Oct. 12, 2006

(30) Foreign Application Priority Data
Mar. 28, 2005 (JP) .......................... P2005-090711

(51) Int. Cl.
E21F 17/02 (2006.01)
F16L 3/00 (2006.01)

(52) U.S. Cl. .......................... 248/62; 248/58; 248/59; 248/61; 248/63; 248/64; 248/316.1; 248/316.6; 248/74.1; 248/74.2; 248/74.3; 248/74.4; 248/74.5; 24/284; 403/310; 403/311; 403/312; 403/344

(58) Field of Classification Search .................. 248/58, 248/59, 61, 62, 63, 64, 316.1, 316.6, 74.1, 248/74.2, 74.3, 74.4, 74.5; 24/282, 284; 403/344, 310, 311, 312
See application file for complete search history.

(56) References Cited

U.S. PATENT DOCUMENTS

| 806,192 | A | * | 12/1905 | Russell | 248/59 |
| 1,158,633 | A | * | 11/1915 | Carpenter | 248/59 |
| 2,397,279 | A | * | 3/1946 | Le Vesconte | 248/74.3 |
| 6,398,170 | B1 | * | 6/2002 | Wada | 248/74.5 |
| 6,779,762 | B2 | | 8/2004 | Shibuya | |
| 7,077,263 | B1 | * | 7/2006 | Richardson et al. | 198/844.2 |

FOREIGN PATENT DOCUMENTS

| JP | 45-7269 | 4/1970 |
| JP | 2002-039442 | 2/2002 |

* cited by examiner

Primary Examiner—Carl D. Friedman
Assistant Examiner—Nkeisha J. Dumas
(74) Attorney, Agent, or Firm—Roylance, Abrams, Berdo & Goodman, L.L.P.

(57) ABSTRACT

This invention's suspensory fastener for piping is characterized in that the fastener is arranged from the two members of a long band and short band, a coupled state maintaining means, which maintains a state wherein a bolt of a bolt-and-nut set that is provided at a lower end coupling portion of the above-mentioned long band is engaged with an opening with guiding entrance of lower end coupling portion of the above-mentioned short band and the two lower end coupling portions are overlapped with each other, is provided, and coupling and releasing of the coupling of the lower end coupling portion of the above-mentioned long band with the fastener coupling portion of the above-mentioned short band are enabled without separation of the bolt-and-nut set provided at the lower end coupling portion of the above-mentioned long band.

7 Claims, 11 Drawing Sheets

SUSPENSORY FASTENER FOR PIPING

BACKGROUND OF THE INVENTION

1. Field of the Invention

This invention relates to a suspensory fastener for piping, which is one of type of supporting hardware for piping that is used for supporting or fixing various types of piping, such as service water pipes, sewage pipes, gas pipes, cooling pipes, and heating pipes to a floor surface, wall surface, ceiling, etc., of a building or structure and is of the type that is used to suspend and fix piping from a ceiling, etc.

2. Description of the Invention

Supporting hardware for piping can be classified into several types according to differences in the position at which a pipe is fixed, such as a floor surface, wall, and ceiling, and such types differ in structure. Even among suspensory fastener for piping for ceiling, to which the present invention belongs, there are several types that differ in structure. The difference in structure is related to the difference in the method of attachment to an anchor bolt embedded in a ceiling slab concrete. Specifically, with an arrangement (type A), with which a suspensory fastener is fixed directly to an anchor bolt, the fastener is generally arranged from a single metal plate.

With this type A, the supporting of a pipe in pipe laying work is completed by inserting a bolt into penetration holes provided at joining portions positioned at respective end portions of a band and fastening the bolt with a nut.

With an arrangement (type B), wherein the fastener is attached to an anchor bolt via a height-adjusting member called a turnbuckle, since the upper end side of the fastener must be fixed to two leg portions of the turnbuckle, the fastener is normally arranged from two curved metal plates called bands. This type is classified further into an arrangement (type B-1), wherein the fastener is completely separated into two members, an arrangement (type B-2), wherein end portions of a pair of bands are coupled together by a hinge mechanism, an arrangement (type B-3), wherein end portions of a pair of bands are coupled together by a separable engagement mechanism, etc.

With type B-1, the supporting of a pipe in pipe laying work is completed by fixing the free ends of the bands by means of a band end fastening member, such as a bolt and nut, with the pipe being grasped by curved portions of the bands, the upper end sides of which are fixed to the turnbuckle.

With types B-2 and B-3, the supporting of a pipe in pipe laying work is completed by fixing the free ends of the bands at an upper position to the turnbuckle by means of a band end fastening member, such as a bolt and nut, with the pipe being grasped by the two bands being assembled together by the hinge mechanism or engagement mechanism.

Though in terms of classification, this invention belongs to type B-1 of the above-described classification, a characteristic of this invention is that it comprises a pair of bands that differ in length.

In a Prior Art Document 1 (U.S. Pat. No. 6,779,762), FIG. 2 shows type A of a suspensory fastener for piping. This suspensory fastener for piping has a band, which is for grasping a pipe and is formed of a single metal plate called a band, and has a structure with which, after inserting an anchor bolt, which is disposed in a ceiling slab concrete, through an opening of an attachment portion formed at a central portion of the band, the band is fixed by a nut that is attached from the end of the anchor bolt and the respective ends of the band are open in C-like form to enable insertion of the pipe. With this type of suspensory fastener for piping, the pipe is positioned at the inner side of the band that opens in C-like form due to elasticity and the end portions of the band are fastened and fixed by a bolt and nut while bending the band so as to grasp the pipe.

With the above-described suspensory fastener for piping shown in FIG. 2 of the Prior Art Document 1, the fixing of the free ends of a band is performed at a position below piping.

FIG. 5 of the Prior Art Document 1 shows type A of a suspensory fastener for piping, with which the free ends of a band are fixed together at a side of a piping.

FIGS. 6, 8, and 9 of the Prior Art Document 1 show type A of a suspensory fastener for piping, with which the free ends of a band are fixed together at a side portion at an oblique pipe position of 135 degrees.

FIGS. 1 and 3 to 5 of a Prior Art Document 2 (Japanese Published Examined Utility Model Application No. S45-7269) show type B-1 of a suspensory fastener for piping with an arrangement wherein the fastener is separated completely into two members comprising pair of curved metal plate.

FIG. 11 of the Prior Art Document 1 shows type B-2 of a suspensory fastener for piping, wherein end portions of a pair of bands are joined together by a hinge mechanism.

FIG. 1 of a Prior Art Document 3 (Japanese Published Unexamined Patent Application No. 2002-39442) shows type B-3 of a suspensory fastener for piping, wherein end portions of a pair of bands are coupled by a separable joining mechanism.

SUMMARY OF THE INVENTION

With all types of the suspensory fastener for piping described above, the final step in pipe laying work is the tightening of a nut to a bolt. This task is performed on a ladder or a movable platform, and not only are there various positions at which a pipe is to be supported but difficult working postures are necessitated in many cases due to narrow corners, inadequate height, etc. The work is thus rarely performed at a stable posture. It is not an overstatement to say that pipes are located at positions where work is difficult to perform.

Also, though the work of supporting a pipe by tightening a bolt and nut is work requiring both hands, due to the above-mentioned difficult working postures, the bolt or nut is dropped, etc., in many cases, leading to significant lowering of the work efficiency.

For example, in a case where a pipe is positioned close to a ceiling, performing a band fastening work using a bolt and nut from a position immediately below the pipe at a location at which the pipe supporting position is of inadequate height, an extremely difficult working posture is necessitated. Also, since the position, at which the band is to be fastened by a bolt and nut, protrudes vertically below the pipe, there is the danger of a worker becoming injured by bumping his/her head against this portion.

As a means for solving the above problems, the present inventor has proposed a suspensory fastener for piping, which enables the bolt and nut tightening work to be performed at an obliquely downward position of 135 degrees of a pipe as shown in FIGS. 6 and 8 to 10 of the Prior Art Document 1.

Also, as a means for preventing the detachment of bolts and nuts during work, the present inventor proposed the arrangement shown in FIGS. 3 and 7 of the Prior Art Document 1.

Though the equipping of the suspensory fastener for piping with a means for preventing the detachment of bolts and nuts enables a worker to work without anxiety and has improved the working efficiency, the present inventor has continued research towards improving the working efficiency further.

As it is clear from the above, a first object of this invention is to provide a suspensory fastener for piping, with which the work of tightening a bolt and nut at a position vertically below a pipe can be eliminated and enables pipe laying work to be performed readily at locations of inadequate height and the working efficiency to be improved further. A second object of this invention is to provide a suspensory fastener for piping, with which accidents of detachment of bolts and nuts can be prevented.

The above objects of this invention are achieved by the following arrangements.

1. A suspensory fastener for piping, with which upper end attachment portions are fixed to an anchor, embedded in a ceiling slab concrete, or to a turnbuckle, connected to a hanger bolt, etc., that is continuous to the anchor; the fastener comprising the two members of a long band and short band;

the above-mentioned long band having a curved portion of a length necessary for grasping at least an upper surface, one side surface, and a lower surface of a pipe, having its lower end bent and formed to a lower end coupling portion, and having a bolt and nut disposed in a penetration hole;

the above-mentioned short band having a curved portion of a length necessary for holding the periphery of the pipe at positions at which the curved portion of the above-mentioned long band does not exist, having its lower end bent and formed to a lower end coupling portion, and being provided with an opening with guiding entrance for engagement with the bolt provided at the lower end coupling portion of the above-mentioned long band;

there being provided a coupled state maintaining means, which maintains the state wherein the two lower end coupling portions are overlapped with each other with the opening with guiding entrance of the lower end coupling portion of the above-mentioned short band being engaged with the bolt of the bolt-and-nut set provided at the lower end coupling portion of the above-mentioned long band; and coupling and releasing of the coupling of the lower end coupling portion of the above-mentioned long band with the lower end coupling portion of the above-mentioned short band being enabled without separation of the bolt-and-nut set provided at the lower end coupling portion of the above-mentioned long band.

2. The suspensory fastener for piping according to 1, wherein the length of the long band is a length necessary for grasping the pipe up to a position of approximately 45 degrees with respect to a vertical line passing through the center of the pipe.

3. The suspensory fastener for piping according to 1 or 2, wherein penetration holes for insertion of a bolt for fixing to the turnbuckle are provided in the upper end attachment portion of the long band and the upper end attachment portion of the short band.

4. The suspensory fastener for piping according to 3, wherein the penetration hole provided in the upper end attachment portion of the short band is an elongate hole.

5. The suspensory fastener for piping according to 3, wherein the penetration hole provided in the upper end attachment portion of the short band is a circular hole of larger diameter than the penetration hole provided in the upper end attachment portion of the long band.

6. The suspensory fastener for piping according to any of 1 to 5, wherein the coupled state maintaining means comprises: a notched portion, provided in one of either the lower end coupling portion of the long band or the lower end coupling portion of the short band; and a protruding portion, provided in the other of either the lower end coupling portion of the long band or the lower end coupling portion of the short band.

7. The suspensory fastener for piping, according to any of 1 to 5, wherein the coupled state maintaining means comprises a bent portion, provided at a side surface of the lower end coupling portion of the short band.

8. The suspensory fastener for piping, according to any of 1 to 5, wherein the coupled state maintaining means comprises a bent portion, provided at a side surface of the lower end coupling portion of the long band.

9. The suspensory fastener for piping, according to any of 1 to 5, wherein the coupled state maintaining means comprises protruding portions, provided at a periphery of the bolt hole of the lower end coupling portion of the long band, and openings, provided at the lower end coupling portion of the short band and corresponding to the outer peripheral sizes of the above-mentioned protruding portions.

10. The suspensory fastener for piping, according to any of 1 to 9, wherein an idle rotation preventing means for the bolt and nut is provided at either of the lower end coupling portions of the long band and short band.

11. The suspensory fastener for piping according to 10, wherein the idle rotation preventing means for the bolt and nut is a recessed portion provided at a periphery of the bolt hole of the lower end coupling portion of the long band.

12. The suspensory fastener for piping according to 10 or 11, wherein the idle rotation preventing means for the bolt and nut serves in common as the coupled state maintaining means of the lower end coupling portion of the long band and the lower end coupling portion of the short band.

DETAILED DESCRIPTION OF PREFERRED EMBODIMENTS

Figure 1:
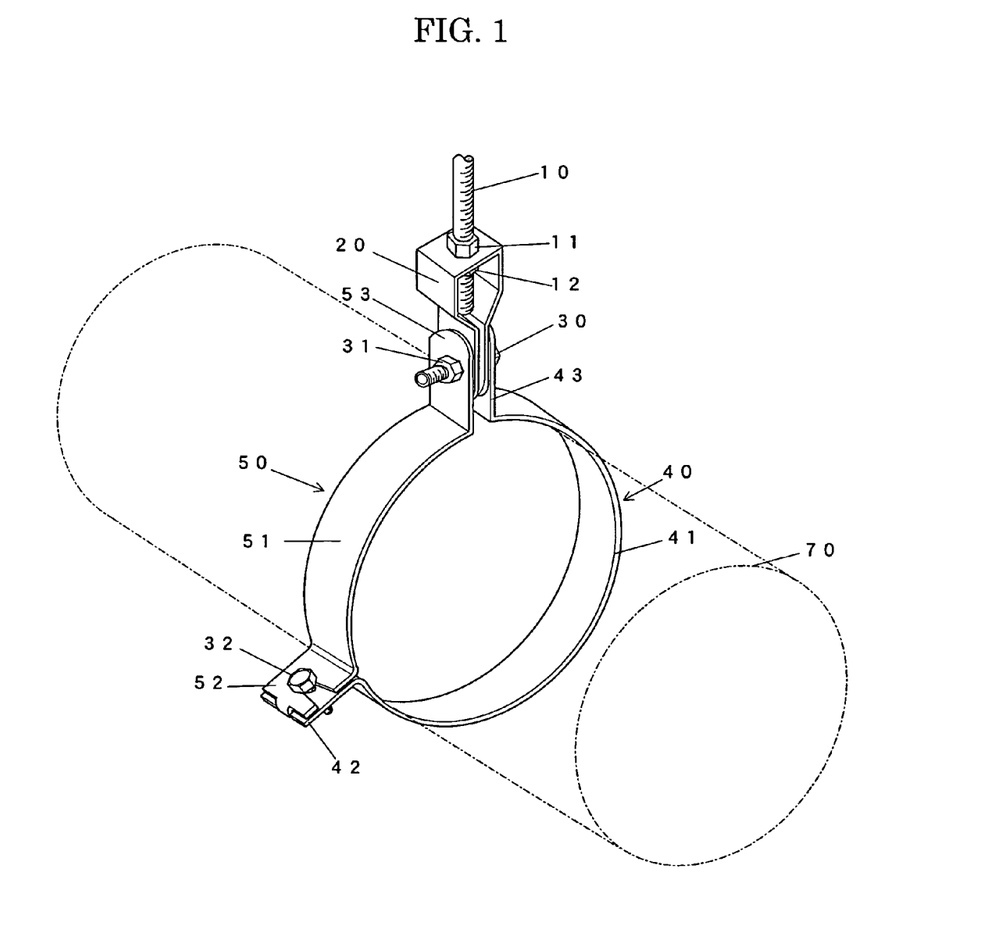
FIG. 1 is a isometric view showing a first embodiment of this invention.

A suspensory fastener for piping of this invention shall now be described in accordance with FIG. 1.

Though the basic components of this invention's suspensory fastener for piping are: (1) a turnbuckle 20; (2) a band unit comprising a pair of a long band 40 and a short band 50, which differ in length; (3) a bolt 30 and a nut 31 for attaching the upper ends of the above-mentioned band unit to the turnbuckle 20; and (4) a bolt 32 and nut 33 for coupling together the lower ends of the above-mentioned band unit; the most important point is that, in addition to the above components, (5) a special means for coupling together the lower ends of the long band 40 and the short band 50 is provided. This special means is arranged to enable the coupling and the releasing of the coupling of the lower ends of the long band 40 and the short band 50 to each other by the bolt-and-nut set. This special arrangement shall be described in detail later.

Since the turnbuckle 20 can rotate freely with respect to an anchor bolt or hanger bolt 10, which is embedded in a ceiling slab concrete, a pipe can be accommodated for any horizontal direction of installation. Though the height of the pipe is defined by the attachment position of the turnbuckle 20 with respect to the anchor bolt 10, which is adjusted by nuts 11 and 12, an embodiment that does not include such a height adjusting arrangement is also included in the present invention.

The set of the bolt 30 and the nut 31 is used to attach upper end attachment portions 43 and 53, which are disposed respectively at the respective upper ends of the long band 40 and the short band 50, to a leg portion of the turnbuckle 20, and the set of the bolt 32 and the nut 33 is used to fasten and fix a lower end coupling portion 42 of the long band 40 to a lower end coupling portion 52 of the short band 50.

Since the bolt-and-nut sets incorporated in the suspensory fastener for piping of this invention do not need to be separated during pipe laying work, the removal of a nut from a bolt can be prevented by a method such as splitting and spreading the tip of the bolt, attaching a cap or a stopper, etc., after assembling the nut and the bolt together.

The bands 40 and 50 are a pair of plate-like members that differ in length, are formed to curved states from plate materials of steel, stainless steel, or other metal, have curved portions 41 and 51 formed at the respective central portions in correspondence to the diameter of the pipe, have the upper and lower end portions bent to flat, plate-like shapes, have the upper end attachment portions 43 and 53 provided at the respective upper ends, and have the lower end coupling portions 42 and 52 provided at the respective lower ends.

The lengths of the long band 40 and the short band 50 are defined by the lengths of the respective curved portions 41 and 51.

The length of the curved portion 41 of the long band 40 is a length necessary for grasping at least an upper surface, one side surface, and a lower surface of the pipe, in other words, a length necessary for grasping the pipe up to a position of approximately 45 degrees with respect to a vertical line that passes through the center of the pipe. The length of the curved portion 51 of the short band 50 is a length necessary for holding the periphery of the piping at positions at which the above-mentioned curved portion 41 of the long band 40 does not exist.

Figure 11:
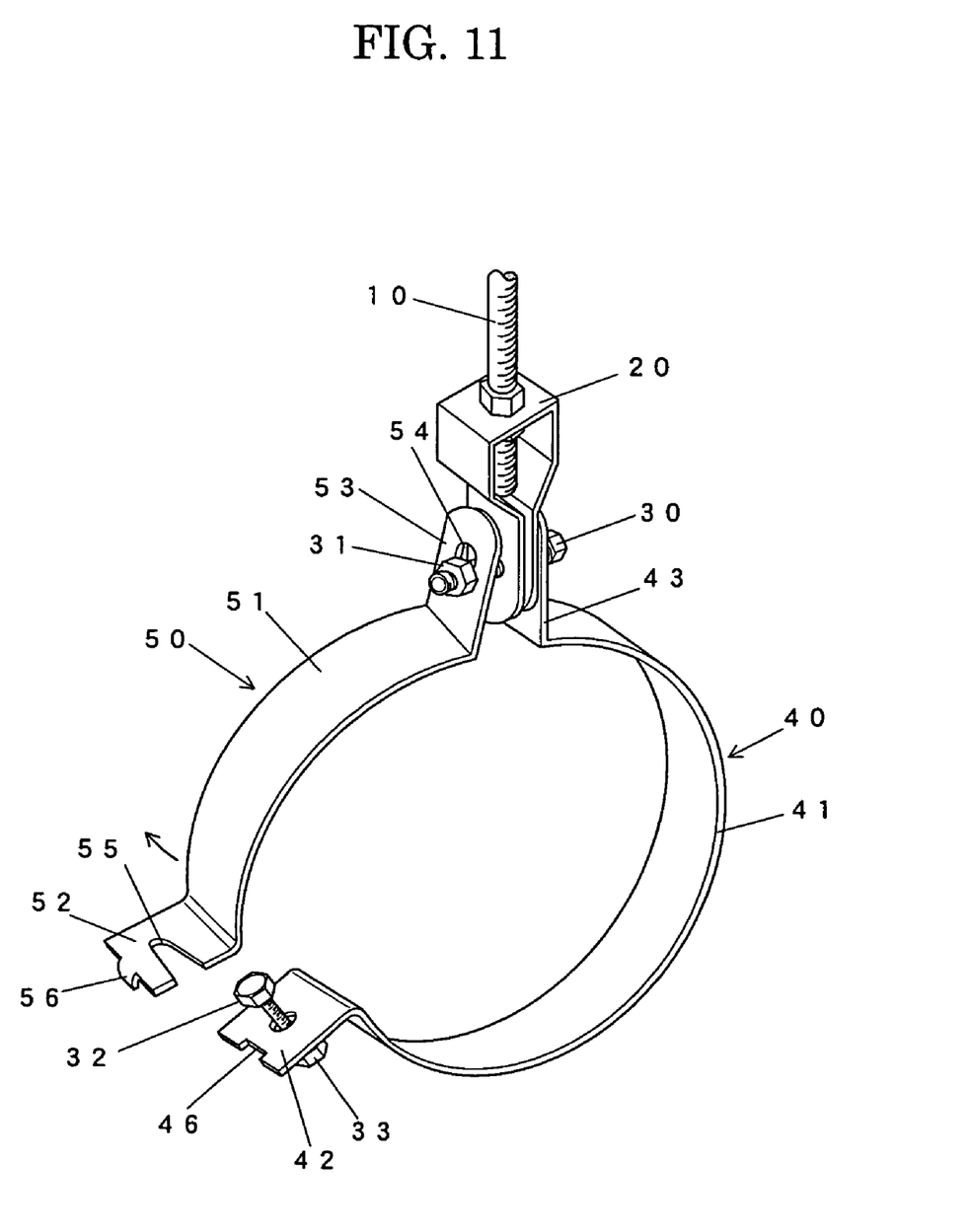
FIG. 11 is an explanatory diagram of piping work by this invention.

One characteristic of this invention's suspensory fastener for piping is that the end portions of the bands 40 and 50 are not coupled by a hinge, etc., and are in a state of being separated into two members. Though there exists the conventional example with the structure wherein bands that are arranged as two members are coupled by a hinge structure formed at lower end portions as shown in FIG. 11 of the Prior Art Document 1, with this conventional example, the band at one side is rotated and an attachment portion provided at the upper end thereof is fixed by a bolt and nut to a leg portion of a turnbuckle. This example thus differs completely from the present invention in arrangement. There is also known a structure, having a pair of bands and wherein, in place of the above-described hinge structure, the lower ends of both bands are coupled by means of detachable engaging means provided at the respective lower ends of the bands. In terms of working procedure, this structure is one with which the pair of bands, which are initially in a separated state, are assembled to an engaged state at the lower end sides and attachment portions provided at the upper ends of both bands are fastened by a bolt and nut and thereby fixed to a leg portion of a turnbuckle 20.

Meanwhile, with the arrangement of the present invention, the work of attaching the upper end attachment portions 43 and 53, provided at the upper ends of the long band 40 and the short band 50, to the leg portion of the turnbuckle 20 by means of the bolt 30 and the nut 31 is performed first, and then upon supporting the pipe 70 by means of grasping by the long band 40, the lower end portions of the long band 40 and the short band 50 are fixed together by the bolt 32 and the nut 33.

With the present invention, an arrangement is employed wherein, in the process of fixing the lower end portions of the long band 40 and the short band 50 together by the bolt 32 and the nut 33, the bolt-and-nut set does not need to be separated, and furthermore, a coupled state maintaining means 60 is equipped in order to prevent the releasing of the coupling together of the lower end portions of the long band 40 and the short band 50 by the bolt 32 and the nut 33.

Even if a conventional suspensory fastener for piping has an arrangement apparently similar to this invention's coupled state maintaining means 60 as a means for coupling together the lower end portions of bands that are arranged as two members, such an arrangement differs completely in actions and effects from this invention's coupled state maintaining means.

Whereas the hinge and the engaging means of the conventional examples are for assembling together a pair of bands that are in a separated state to an engaged state, the coupled state maintaining means 60 of this invention is strictly an arrangement for aiding the fastening and fixing by the bolt and nut and functions to prevent the coupling of the lower end sides of the bands 40 and 50, which are in a state of being fastened and fixed by the bolt and nut, from disengaging in time due to vibration, etc.

The long band 40, the short band 50, and the coupled state maintaining means 60 of this invention's suspensory fastener for piping shall now be described with an understanding of the above as a premise.

The band 40 and the band 50 are arranged as a pair of bands that are in a separated state, in which the joining portions thereof are not coupled. The long band 40 has the curved portion 41 that grasps the pipe 70 set to a long length, and the short band 50 has the curved portion 51 that holds the remaining portion of the pipe 70 set to a short length. The position, at which the plate-like joining portion 42, formed by bending the lower end of the long band 40, and the plate-like joining portion 52, formed by bending the lower end of the short band 50, are joined, is set to a position obliquely downwards with respect to the vertical line that passes through the center of the pipe 70 and is preferably set to a position that is substantially 45 degrees downward from center of the pipe 70. In comparison to the case where the junction portion is positioned vertically below the pipe as illustrated in FIG. 1 of the Prior Art Document 1 and the case where junction portion is positioned immediately lateral to the pipe as illustrated in FIG. 5 of the Prior Art Document 1, the present junction position is within an angle formed by a vertical external tangent to the pipe 70 and the external tangent to the pipe at the lower side and since there are thus no parts that protrude vertically downwards from the pipe 70, a merit is provided in terms of solving the aforementioned problem.

Figure 2:
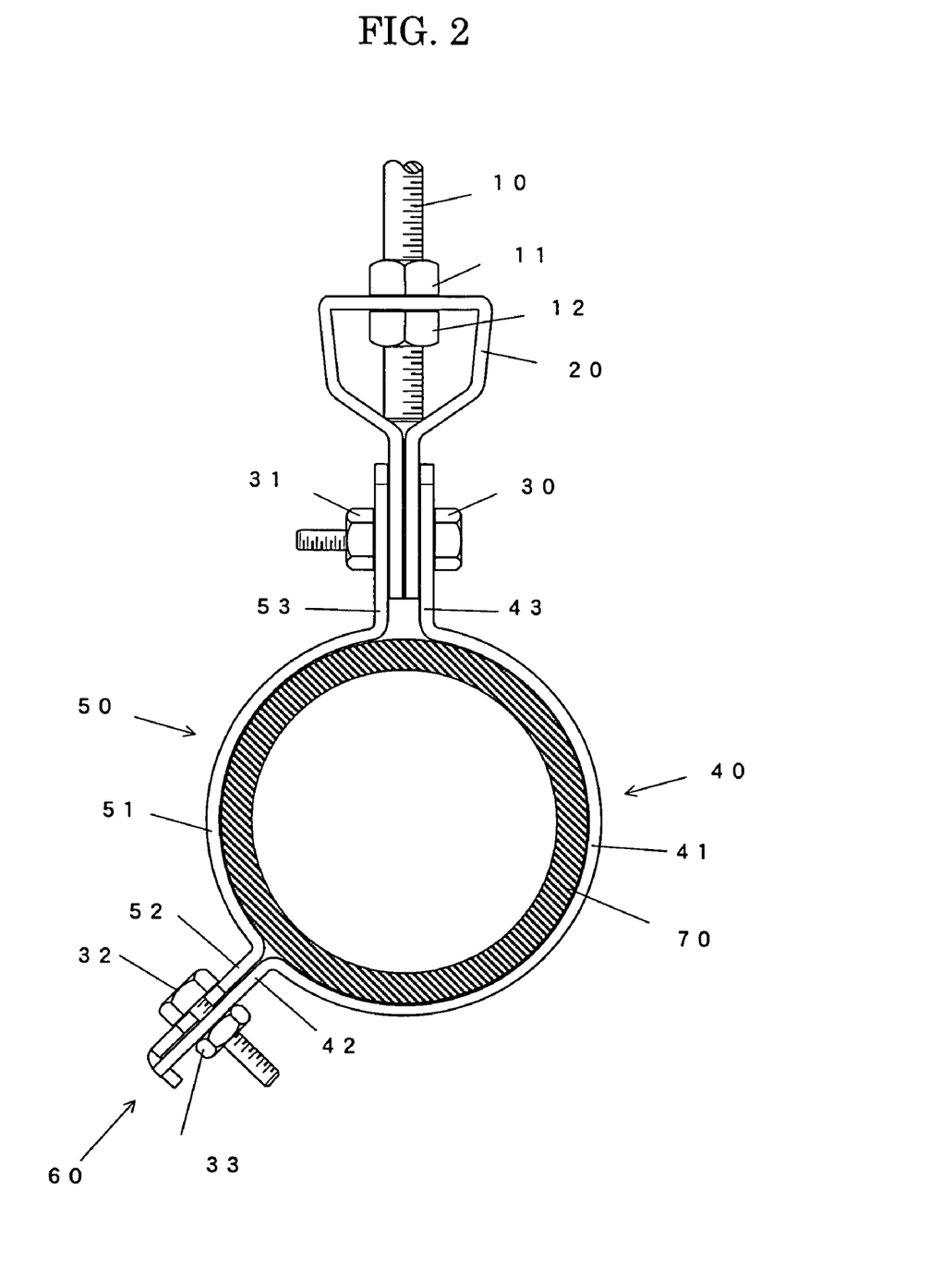
FIG. 2 is a sectional view showing the first embodiment of this invention.

The manner in which the long band 40 and the short band 50 are coupled shall now be described in reference to FIGS. 1 to 3.

The upper end of the long band 40 is bent and formed as the upper end attachment portion 43 and is provided with a penetration hole 44 for the bolt 30. The lower end of the long band 40 is bent and formed as the lower end coupling portion 42 and is provided with a penetration hole 45 for the bolt 32. Furthermore, a notched portion 46, which shall be described in detail later, is provided as one type of the coupled state maintaining means 60 at the lower end coupling portion 42 of the long band 40.

The upper end of the short band 50 is bent and formed as the upper end attachment portion 53 and is provided with a penetration hole 54 for the bolt 30. The lower end is bent and formed as the lower end coupling portion 52. Furthermore, a protruding portion 56, which shall be described in detail later, is provided as one type of the coupled state maintaining means 60 at the lower end coupling portion 52 of the short band 50.

Figure 3:
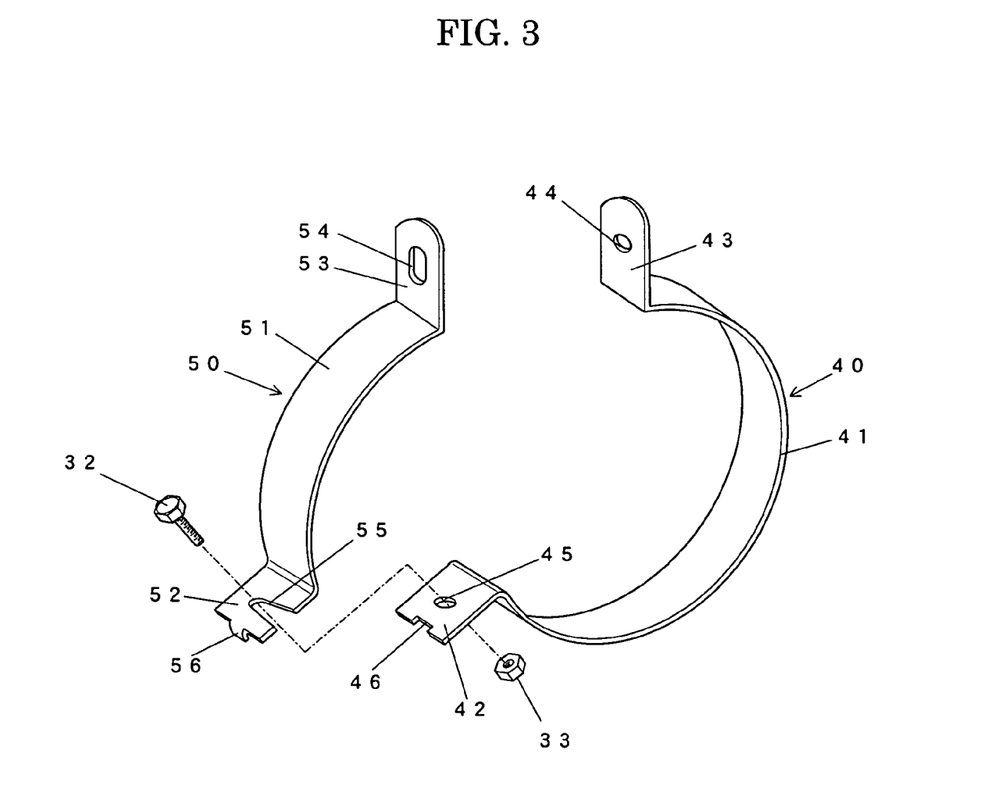
FIG. 3 is an exploded perspective view of the principal portions of the first embodiment of this invention.
Figure 4:
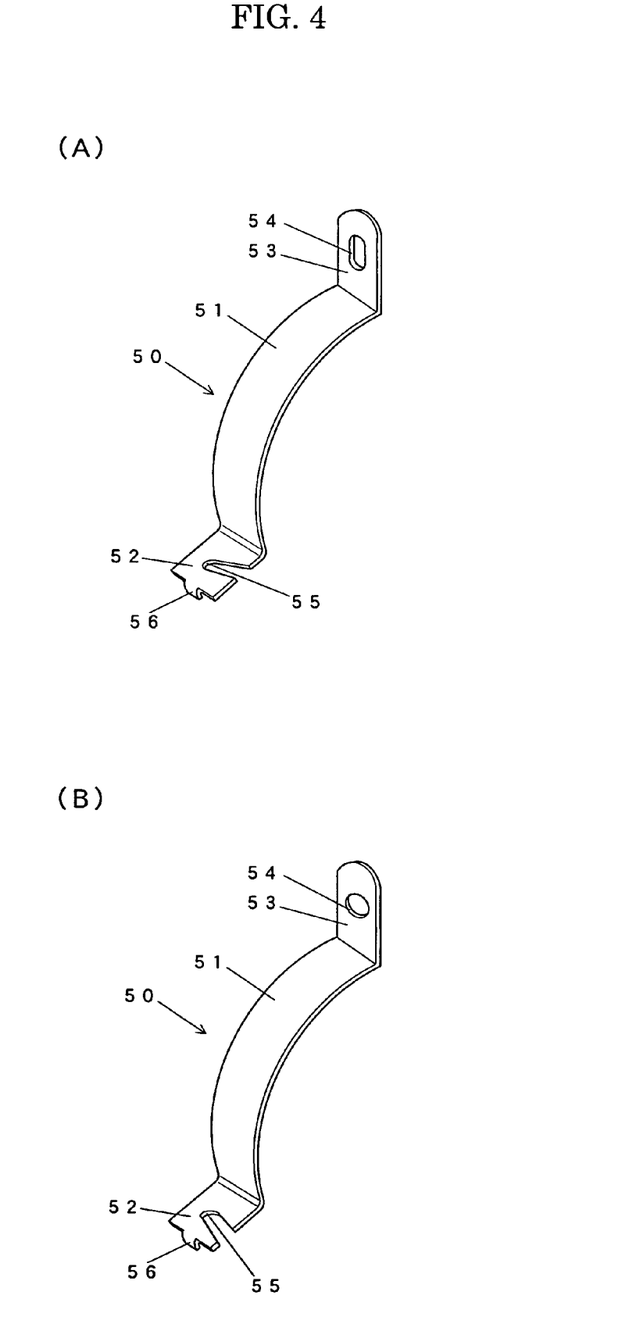
FIG. 4 shows isometric views of two examples of other embodiments of a short band of this invention.

As shown in FIG. 3, an opening 55 with guiding entrance is prepared for the bolt 32 at the lower end coupling portion 52 of the short band 50. This opening 55 with guiding entrance is formed by elongatingly notching while gradually extending a penetration hole of an inner diameter corresponding to the inner diameter of the penetration hole 45 of the long band 40. Whereas in the embodiment shown in FIG. 3, the direction of notching is made perpendicular to the longitudinal direction of the band 50, an embodiment wherein the notch is formed inclininlgy towards the center of the pipe as shown in (A) of FIG. 4 or an embodiment wherein the notch is formed inclininlgy away from the center of the pipe as shown in (B) of FIG. 4 may be employed instead. The lower end coupling portion 52 presses the pipe 70 towards the center of the pipe 70, and in the former case, bolt 32 is received by the innermost portion of opening 55 with guiding entrance and the lower end coupling portion 52 is restricted from moving in a direction away from the bolt 32. Meanwhile, with the latter embodiment, the opening 55 with guiding entrance can be engaged readily with the bolt 32 and since the band 50 can be set by simply sliding the bolt 32 along the direction of the opening 55 with guiding entrance, the work of overlapping the lower end coupling portion 52 with the lower end coupling portion 42 is facilitated.

The penetration hole 54, for insertion of the bolt 30, is disposed at the upper end attachment portion 53 that is formed by bending the upper end of the short band 50. The length of the penetration hole 54 is preferably two to three times the inner diameter of the penetration hole 44 formed in the long band 40. This arrangement is for facilitating the work of overlapping the lower end coupling portion 52 at the lower end side with the lower end coupling portion 42, and an embodiment employing a penetration hole of larger inner diameter than the inner diameter of the penetration hole 44 in place of the penetration hole 54 is also possible. Also, through in the illustrated embodiment, the direction of the penetration hole 54 is made parallel to the longitudinal direction of the upper end attachment portion 53, it may instead be inclined in either direction.

The bolt 32 has the nut 33 attached thereto in a state of being inserted through the penetration hole 45 provided in the lower end coupling portion 42 of the long band 40. With the suspensory fastener for piping of this invention, since the bolt 32 is used to support the pipe with the nut 33 always being attached, accidents, wherein the bolt 32 or the nut 33 is dropped as in the conventional arrangement that requires the removal of the nut 33 during the pipe laying work, never occur.

Figure 5:
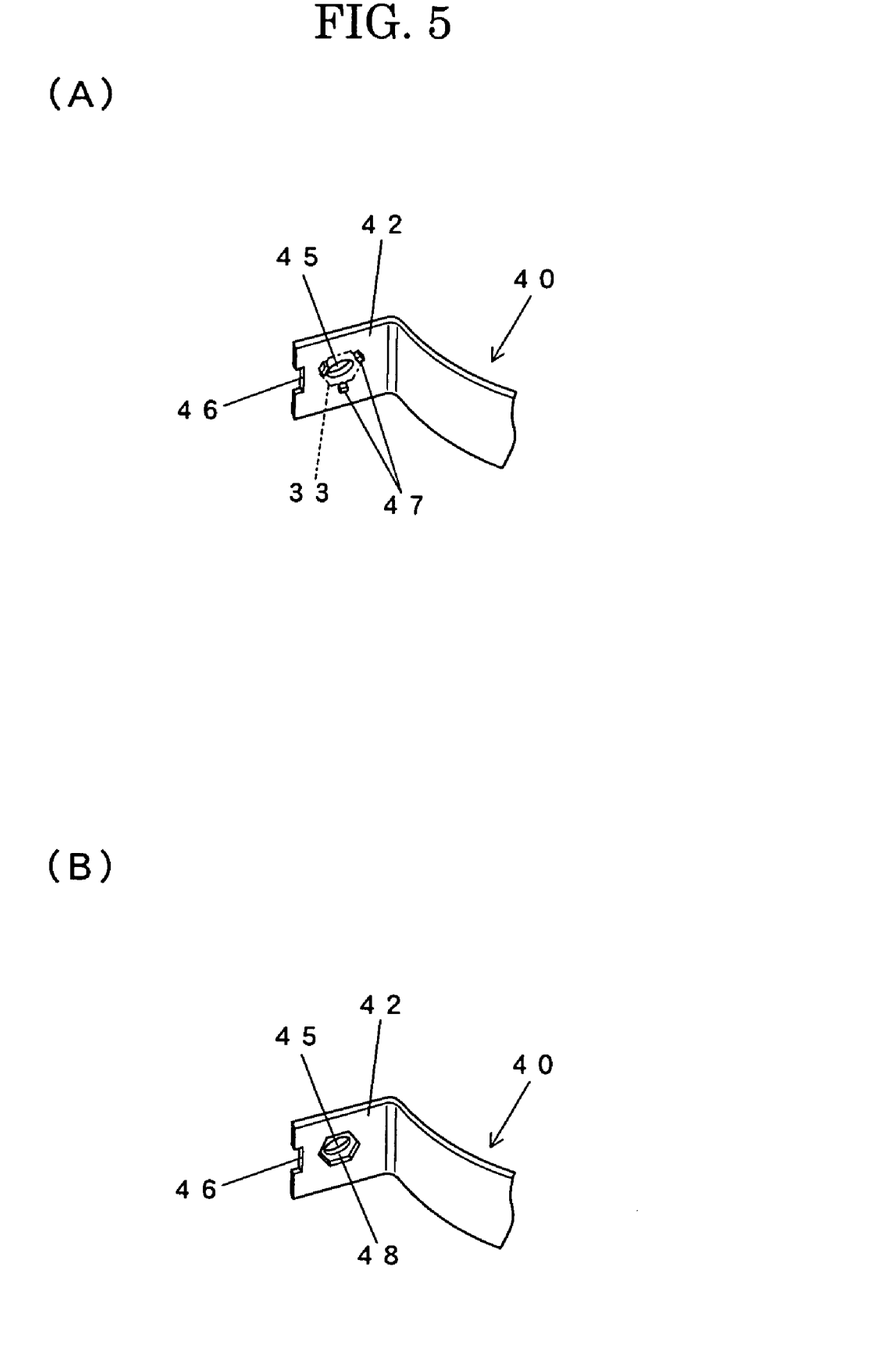
FIG. 5 shows isometric views of the principle portions of two examples of other embodiments of a long band of this invention.

The work of tightening the nut 33 and the bolt 32 must be performed with the lower end coupling portion 42 and the lower end coupling portion 52 being overlapped, and an embodiment that is added with an arrangement for preventing idle rotation in this process is also of merit. For example, an arrangement wherein protruding strips 47, which sandwich the nut 33, are formed at the periphery of the penetration hole 45 as shown in (A) of FIG. 5 is employed. Here, the idle rotation of the nut 33 can be prevented by simply setting the nut 33 between the protruding strips 47 and holding with the finger. An arrangement, wherein a hexagonal recessed portion 48, the shape of which corresponds to the outer shape of the nut, is formed in the periphery of the penetration hole 45 as shown in (B) of FIG. 5 is also possible.

Since the above-mentioned protruding strips 47 and the recessed part 48 can be formed at the same time as the press-forming of the main body of the band, these will not lead to a rise in manufacturing cost. The bolt 32 and the nut 33 may also be positioned in reversed positions.

A known means for preventing the detachment of the bolt, such as those described in the Prior Art Document 1, may be employed for preventing the idle rotation of the bolt 32 and the nut 33.

The coupled state maintaining means 60 for maintaining the coupled state of the lower end coupling portion 42 of the long band 40 and the lower end coupling portion 52 of the short band 50 shall now be described.

As shown in FIG. 3, the notched portion 46 is provided at the end portion of the lower end coupling portion 42 of the long band 40, and the protruding portion 56 is provided at the end portion of the lower end coupling portion 52 of the short band 50. The width of the notched portion 46 corresponds to the width of the protruding portion 56. The notched portion 46 and the protruding portion 56 may be provided instead at the respectively opposite members.

Figure 6:
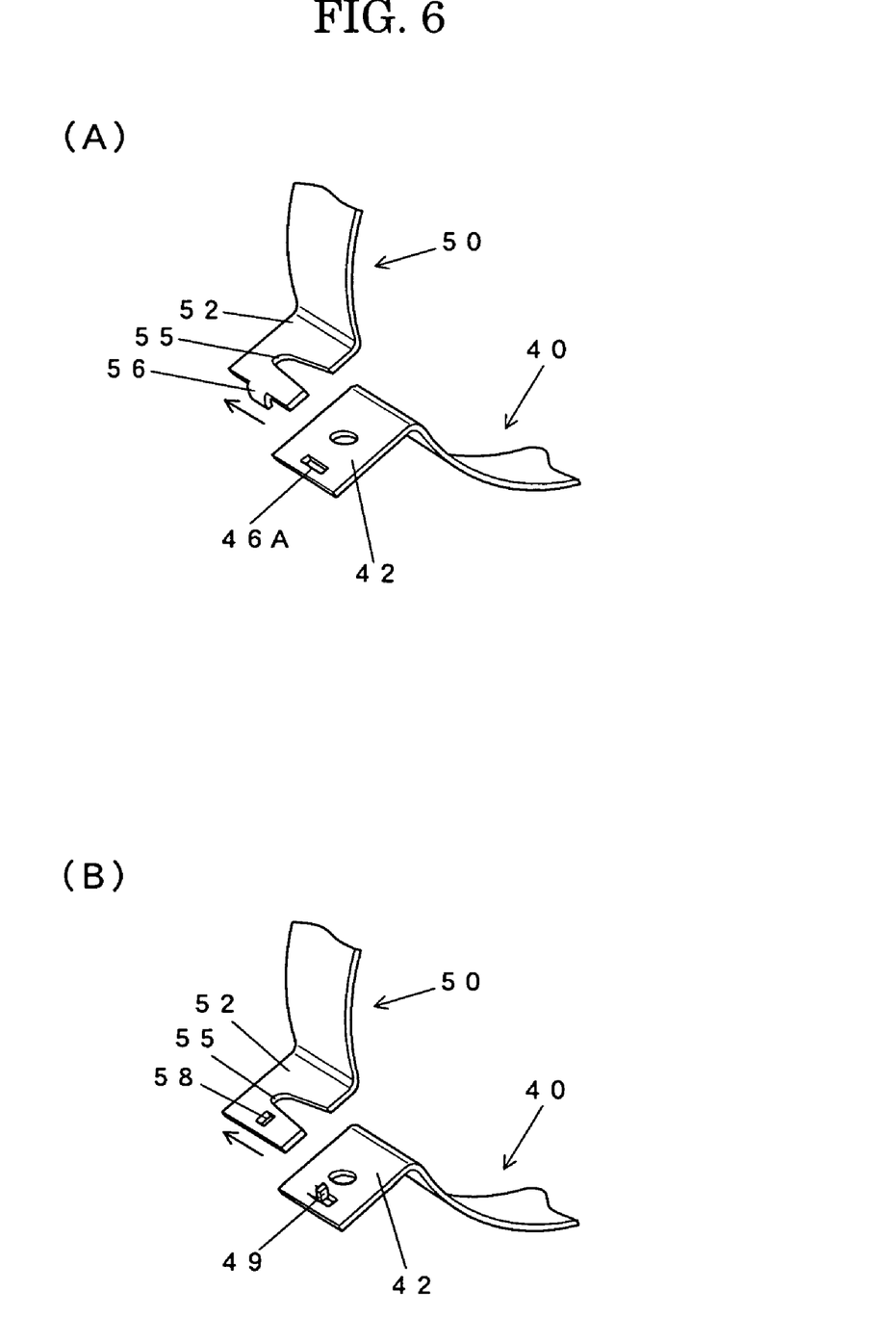
FIG. 6 shows isometric views of two examples of other embodiments of a coupled state maintaining means of this invention.

Maintenance of the coupled state is also made possible by providing an arrangement wherein, in place of the above-mentioned notched portion 46, a penetration hole 46A, with an inner diameter corresponding to the width and thickness of the protruding portion 56, is disposed at the lower end coupling portion 42 of the long band 40 as shown in FIG. 6 and the protruding portion 56 at the short band 50 side is inserted into the penetration hole 46A at the long band 40 side (see A in FIG. 6). The protruding portion 56 and the penetration hole 46A may be provided instead at the respectively opposite members with this embodiment as well (see B in FIG. 6).

The coupled state maintaining means 60 functions to prevent the lower end coupling portion 42 and the plate-like joining portion 52 from shifting when these are overlapped, and in the state wherein the lower end coupling portion 52 of the short band 50, the lower end coupling portion 42 of the long band 40 are overlapped, since the base portion of the opening 55 with guiding entrance contacts the bolt 32, the movement of the lower end coupling portion 52 in the rightward direction in the FIGURE is restricted. It is thus sufficient that the coupled state maintaining means 60 have the function of preventing the lower end coupling portion 52 of the short band 50 from shifting in the direction away from the bolt 32.

Figure 7:
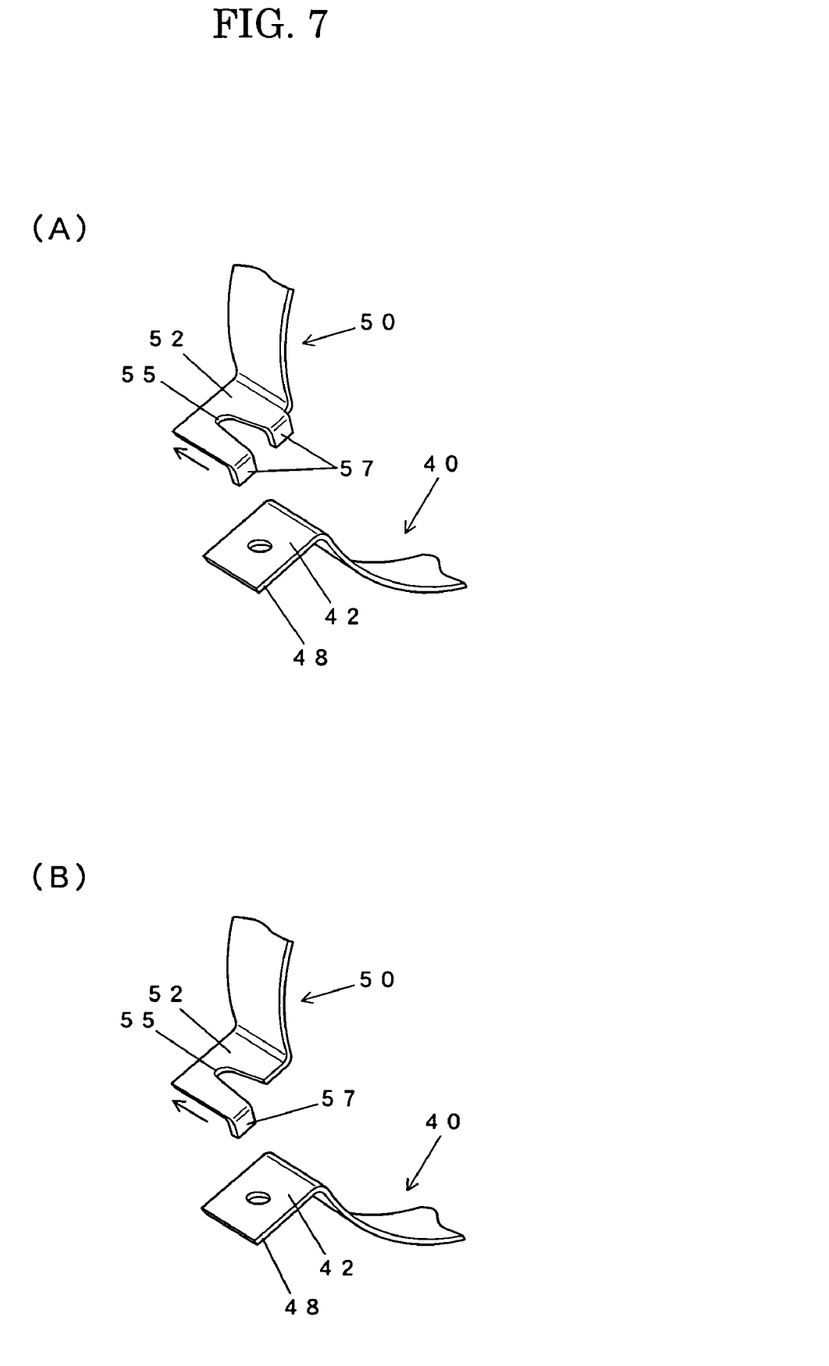
FIG. 7 shows isometric views of two examples of other embodiments of the coupled state maintaining means of this invention.

Thus as another embodiment of the coupled state maintaining means 60, bent portions 57 are provided at one side of the lower end coupling portion 52 as shown in (A) of FIG. 7, and by the inner sides of the bent portions 57 contacting a side portion 48 of the lower end coupling portion 42 of the long band 40 when the lower end coupling portion 52 of the short band 50 overlaps with the lower end coupling portion 42 of the long band 40, the lower end coupling portion 52 of the short band 50 is prevented from shifting in the direction of the arrow.

The bent portion 57 may be a bent portion that is half the length of the side surface of the lower end coupling portion 52 as shown in (B) of FIG. 7 or may be a thin bent portion of a width of just several mm. An embodiment, wherein the bent portion 57 is inserted into a penetration hole provided in the lower end coupling portion 42 of the long band 40 as in the embodiment shown in (A) of FIG. 6, is also possible. Oppositely, a protruding portion 49 may be provided on the upper surface of the lower end coupling portion 42 of the long band 40 and a penetration hole 58 may be provided in the lower end coupling portion 52 of the short band 50 as shown in (B) of FIG. 6.

As the coupled state maintaining means 60, it is sufficient that the lower end coupling portion 52 of the short band 50 be prevented from shifting in the direction indicated by the arrows shown in FIGS. 6 and 7 when the lower end coupling portion 52 of the short band 50 and the lower end coupling portion 42 of the long band 40 are overlapped, and the arrangement thereof is not limited to the embodiments described above.

Figure 8:
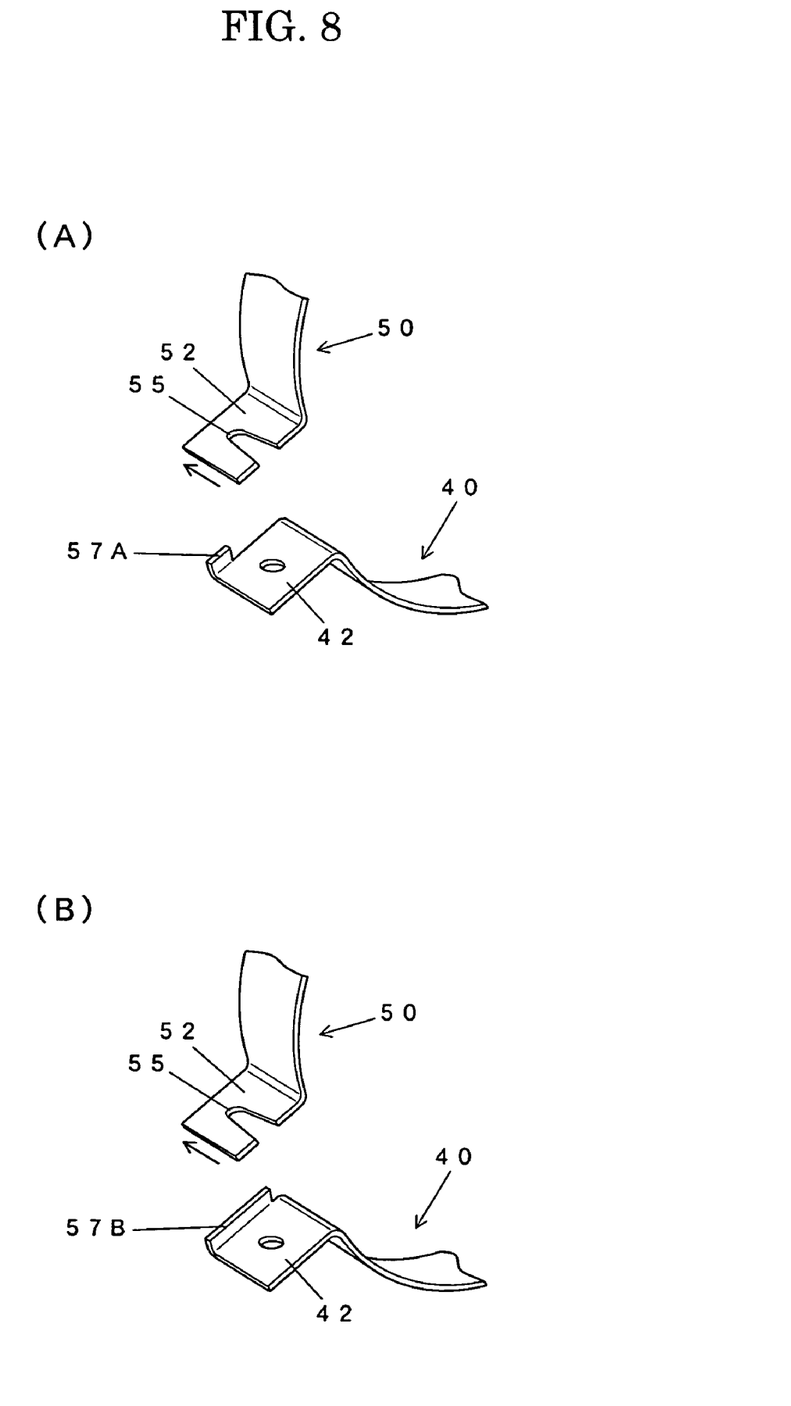
FIG. 8 shows isometric views of two examples of other embodiments of the coupled state maintaining means of this invention.

As variations of the coupled state maintaining means 60 shown in FIG. 7, each of (A) and (B) in FIG. 8 shows an embodiment wherein a bent portion 57A or 57B is provided at a side portion of the lower end coupling portion 42 of the long band 40, and in the state wherein the lower end coupling portion 42 of the long band 40 and the lower end coupling portion 52 of the short band 50 are overlapped, the lower end coupling portion 52 of the short band 50 is prevented from shifting in the direction of the arrow.

Figure 9:
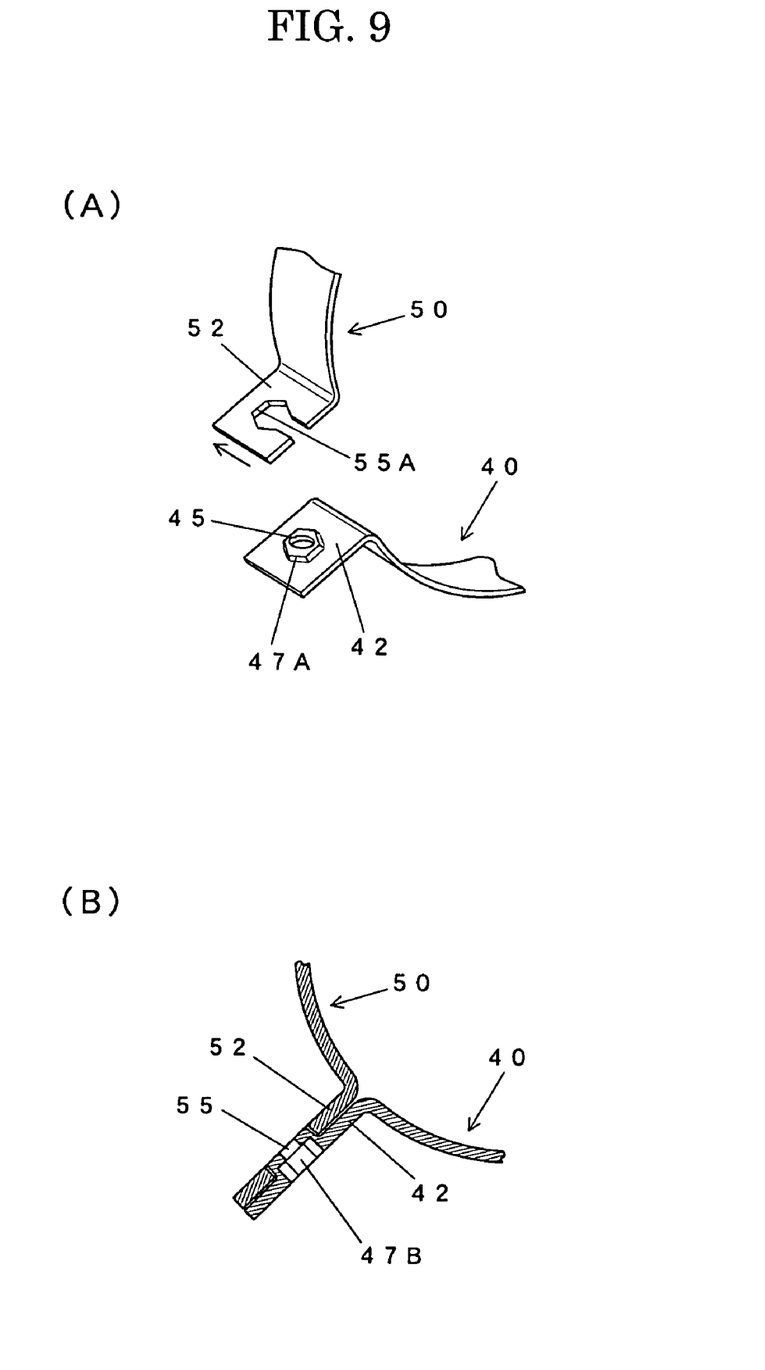
FIG. 9 shows a isometric view of a state prior to coupling and a sectional view of a state after coupling of other embodiments of the coupled state maintaining means of this invention.

FIG. 9 shows an embodiment wherein the coupled state maintaining means 60 serves in common as an idle rotation preventing means for the bolt or nut.

At the periphery of the bolt hole 45 provided in the lower end coupling portion 42 of the long band 40, a recessed portion 47B and a protruding portion 47A, of sizes corresponding to the outer dimensions of the nut or the head of the bolt, are provided at the back surface side and the top surface side, respectively. Since this invention's suspensory fastener for piping is manufactured by pressing, the size of the protruding portion 47A at the top surface side that is formed by pushing outwards will obviously be greater than that of the recessed portion 47B at the back surface side.

At the lower end coupling portion 52 of the short band 50 is provided an opening 55A of a shape and size corresponding to those of the protruding portion 47A, formed at the top surface side of the lower end coupling portion 42 of the long band 40. The opening 55A is provided with a guiding entrance for passage of the bolt 32.

Due to the above-described arrangement, when the lower end coupling portion 42 of the long band 40 and the lower end coupling portion 52 of the short band 50 are overlapped as shown in (B) of FIG. 9, the protruding portion 47A at the long band 40 side fits into the opening 55A at the short band 50 side and the lower end coupling portion 42 of the long band 40 and the lower end coupling portion 52 of the short band 50 are thus prevented from moving laterally in the direction of detachment, (direction of the arrow shown in (A) of FIG. 9).

Figure 10:
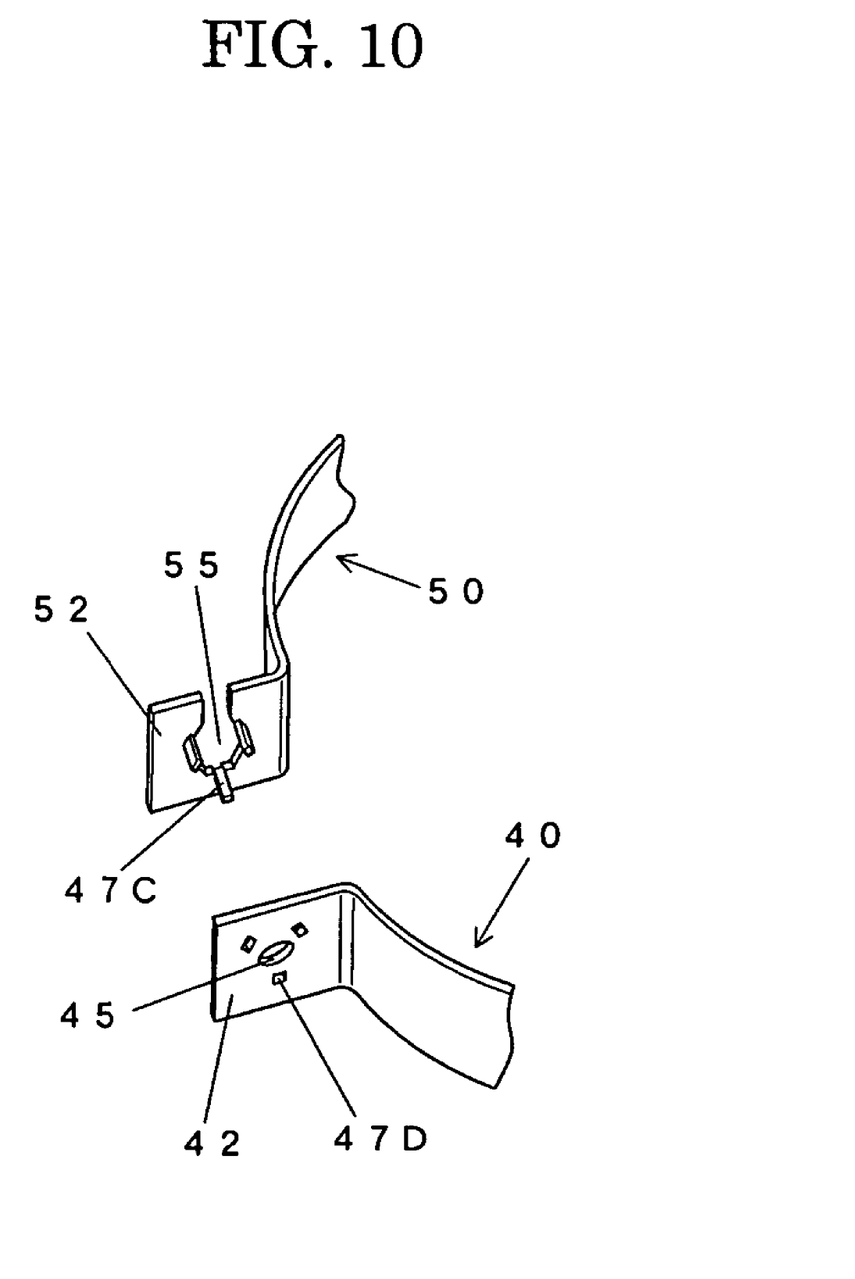
FIG. 10 is a isometric view showing another embodiment of the coupled state maintaining means of this invention.

FIG. 10 shows another embodiment wherein the coupled state maintaining means 60 serves in common as an idle rotation preventing means for the bolt or nut. With this embodiment, a plurality of bent portions 47C are provided at the periphery of the opening 55 with guiding entrance of the lower end coupling portion 52 of the short band 50, and openings 47D of positions and sizes corresponding to the above-mentioned bent portions 47C are provided at the periphery of the bolt hole 45 of the lower end coupling portion 42 of the long band 40. By setting the length of each bent portion 47C to be greater than the plate thickness of the lower end coupling portion 42 of the long band 40 so that the bent portions will protrude outwards, the protruding portions can be made to hold the bolt head or the nut and thereby prevent idle rotation.

Due to the above-described arrangement, when the lower end coupling portion 42 of the long band 40 and the lower end coupling portion 52 of the short band 50 are overlapped, the bent portions 47C at the short band 50 side fit into the openings 47D at the long band 40 side and the lower end coupling portion 42 of the long band 40 and the lower end coupling portion 52 of the short band 50 are thus prevented from moving laterally in the direction of detachment, and at the same time, the protruding portions of the bent portions 47C that protrude outward from the back surface side of the lower end coupling portion 42 of the long band 40 hold the bolt head or the nut to prevent idle rotation.

Pipe laying work using this invention's suspensory fastener for piping shall now be described in accordance with FIG. 11.

The first work in pipe laying is to attach the entirety of this invention's suspensory fastener for piping to the hanger bolt 10, using the turnbuckle 20. In this process, the piping height (distance from the ceiling) is adjusted by setting the tightening position of the nut 11. Then as shown in FIG. 7, the tightening of the nut 31 with respect to the bolt 30 is loosened slightly to enable the long band 40 and the short band 50 to move about the bolt 30 as an axis and, in particular, the short band 50 is rotated in the clockwise direction in the FIGURE and moved away from the position at which the pipe 70 is to be set. The pipe 70 is then supported in the form of being supported by the inner side of the curved portion 41 of the long band 40.

With the pipe 70 being supported by the long band 40, the short band 50 is rotated in the counterclockwise direction so that its lower end coupling portion 52 opposes the lower end coupling portion 42 of the long band 40.

Though in performing the above-described work, the upper sloping surface of the pipe 70 becomes an obstruction, this obstruction can be overcome by the degree of tightening of the bolt 30 and the nut 31 and the penetration hole 54.

From the state shown in FIG. 7, the short band 50 is rotated in the counterclockwise direction so that the opening 55 with guiding entrance that is provided in the lower end coupling portion 52 of the short band 50 engages, from its tip, with the bolt 32 that is inserted in the bolt hole 45 of the lower end coupling portion 42 of the long band 40, and the lower end coupling portion 52 of the short band 50 and the lower end coupling portion 42 of the long band 40 are then put in the state of overlapping completely. In this state, the protruding portion 56, formed at the end portion of the lower end coupling portion 52 of the short band 50, engages with the notched portion 46, formed in the end portion of the lower end coupling portion 42 of the long band 40, and the lower end coupling portion 52 is prevented from becoming detached from the lower end coupling portion 42. In the state in which the lower end coupling portion 52 is overlapped with the lower end coupling portion 42, since the base portion of the opening 55 with guiding entrance contacts the bolt 32, the movement of the lower end coupling portion 52 in the rightward direction in the FIGURE is restricted. The engagement of the protruding portion 56 and the notched portion 46 thus restricts the lower end coupling portion 52 from returning in the leftward direction in the FIGURE. Confirmation of the engagement of the protruding portion 56 and the notched portion 46 is also the confirmation of complete overlapping of the lower end coupling portion 52 of the short band 50 with the lower end coupling portion 42 of the long band 40.

When this confirmation is finished, the bolt 30 and the nut 31, and the bolt 32 and the nut 33 are tightened. When the above work is ended, the state shown in FIG. 1 is arrived at and the pipe laying work at this location is completed.

What is important in the above description of the pipe laying work is that in all stages of the pipe laying work, the bolt 30 and the nut 31, and the bolt 32 and the nut 33 are not separated. The dropping of a bolt or nut during work thus never occurs.

Furthermore with an embodiment added with an arrangement for restricting the idle rotation of the nut 33 or the bolt 32, since the tightening of the fastening member can be performed by simply rotating the bolt 32 or the nut 33, the work is facilitated further and the working efficiency is improved.

By the above-described suspensory fastener for piping of this invention, the following technical effects can be anticipated.

As a first effect, in performing the work of fixing the end portions of the bands together by the bolt and nut upon making the pair of bands grasp the pipe, the bolt-and-nut set provided at the lower end of a band does not have to be disengaged. Put in another way, in inserting the bolt that is provided at the lower end of one band into the bolt hole provided in the lower end of the other band, the nut does not have to be removed from the bolt. That is, the bolt, which is inserted in the bolt hole of the end portion of the one band, can be engaged with the bolt hole at the end portion of the other band with the bolt being assembled to the nut. Thus in comparison to the cases of using the conventional arrangements, where the bolt-and-nut set had to be disengaged necessarily in the same pipe laying work, the error of dropping a bolt or nut will not occur and an extremely high merit is provided in terms of improving the work efficiency.

As a second effect, since the lengths of the band portions of the pair of bands are set so that the position of fastening and fixing the lower end portions of the pair of bands by the bolt and nut will be set obliquely below the pipe and preferably at an angle of 45 degrees with respect to a line vertical to the pipe, a band portion that protrudes vertically downward is eliminated, enabling pipe laying even when there is little spatial allowance in the downward direction at a pipe laying location, and accidents of bumping the head, shoulder, etc., against a protruding portion during work below the pipe can be prevented. A suspensory fastener for piping, which enables pipe laying work to be performed even when there is little spatial allowance below the pipe and with which safety during work is taken into consideration, can thus be provided.

The above-mentioned two effects are not in a simple, independent relationship with respect to each other, and it is important that the arrangement provided in anticipation of the first effect functions effectively along with the arrangement wherein the fastening and fixing of the lower ends of the bands together by the bolt and nut are performed obliquely below the piping and preferably at a position of 45 degrees with respect to the vertical line to the piping in anticipation of the second effect. The arrangement for the second effect can be employed readily due to there being not need to disengage the bolt-and-nut set in the process of the work of fixing while grasping the pipe with the bands, that is, the work of fastening together the lower ends of the pair of bands by the bolt and nut with the pipe being grasped.

Furthermore, the following can be said of the prevention of detachment of bolts and nuts. With the conventional art, in attaching a bolt and nut to the penetration hole of an end portion of a band, a troublesome step of fixing the bolt strongly so as not to rotate on its own or fixing the nut loosely in order to enable rotation of the nut was required and this caused the manufacturing cost to rise. Since with the arrangement of the fastener by this invention, the provision of the idle rotation prevention means for the bolt or nut at the joining portion of either the long band or the short band can be realized at the same time as the step of processing the entirety of either band by a pressing technique, a merit is clearly provided in terms of reducing the manufacturing cost in comparison to the above-described conventional arts.

What is claimed is:

1. A suspensory fastener for piping, with which upper end attachment portions are fixed to an anchor, embedded in a ceiling slab concrete, or to a turnbuckle, connected to a hanger bolt that is continuous to the anchor, the fastener comprising:

two members, where the two members are a long band and short band;

the long band having a curved portion of a length necessary for grasping a pipe at a location approximately 45 degrees with respect to a vertical line passing through a center of the pipe, having a lower end bent and formed to a lower end coupling portion, and having a bolt and a nut disposed in a penetration hole in the coupling portion;

the short band having a curved portion of a length necessary for holding the periphery of the pipe at positions at which the curved portion of the long band does not exist, having a lower end bent and formed to a lower end coupling portion, and being provided with an opening with a guiding entrance for engagement with the bolt provided at the lower end coupling portion of the long band;

a coupled state maintaining means, which maintains a coupled state wherein the two lower end coupling portions are overlapped with each other with the opening with guiding entrance of the lower end coupling portion of the short band being engaged with the bolt of the nut and bolt provided at the lower end coupling portion of the long band;

the coupled state maintaining means comprising a notched portion, provided in one of the lower end coupling portion of the long band and the lower end coupling portion of the short band, and a protruding portion provided in the other of the lower end coupling portion of the long band and the lower end coupling portion of the short band, the protruding portion engaging the notched portion; and coupling and releasing of the coupling of the lower end coupling portion of the long band with the lower end coupling portion of the short band being enabled without separation of the bolt and nut provided at the lower end coupling portion of the long band.

2. The fastener of claim 1, wherein the protruding portion of the maintaining means has a longitudinal dimension extending in a direction substantially perpendicular to a plane of the coupling portion of the respective short band or long band.

3. The fastener of claim 2, wherein the protruding portion is formed at an outer edge of the coupling portion of the respective band.

4. The fastener of claim 3, wherein the outer edge of the coupling portion is a longitudinal edge with respect to a longitudinal dimension of the respective band.

5. The fastener of claim 2, wherein said protrusion is formed at a side edge of said coupling portion, said side edge extending in a direction substantially parallel to a longitudinal dimension of the respective band.

6. The fastener of claim 1, wherein said protrusion mates with said notch to resist lateral movement of said coupling portion of the short band with respect to the coupling portion of the long band while allowing separation in a direction substantially perpendicular to a plane of said coupling portions of the short band and the long band.

7. The fastener of claim 6, wherein said notch is formed in an outer edge of said coupling portion of said respective band.

* * * * *